United States Patent
Fuchs

(10) Patent No.: US 7,223,090 B2
(45) Date of Patent: May 29, 2007

(54) METERING PUMP, METHOD FOR ITS PRODUCTION AND DEVICE FOR CARRYING OUT THE METHOD

(75) Inventor: Karl-Heinz Fuchs, Radolfzell (DE)

(73) Assignee: Ing. Erich Pfeiffer GmbH, Radolfzell (DE)

( * ) Notice: Subject to any disclaimer, the term of this patent is extended or adjusted under 35 U.S.C. 154(b) by 75 days.

(21) Appl. No.: 10/603,059

(22) Filed: Jun. 24, 2003

(65) Prior Publication Data

US 2004/0026458 A1     Feb. 12, 2004

(30) Foreign Application Priority Data

Jun. 25, 2002    (DE) ................. 102 29 618

(51) Int. Cl.
B29C 45/40    (2006.01)
B29C 65/56    (2006.01)

(52) U.S. Cl. ............... 425/444; 425/139; 425/150; 425/576

(58) Field of Classification Search .............. 425/574, 425/575, 576, 588, 125, 803, 134, 139, 150, 425/395, 556, 518, 259, 444, 412
See application file for complete search history.

(56) References Cited

U.S. PATENT DOCUMENTS

| | | | | |
|---|---|---|---|---|
| 3,832,110 A | * | 8/1974 | Hehl | ............. 425/130 |
| 3,915,608 A | * | 10/1975 | Hujik | ............. 425/119 |
| 5,211,798 A | * | 5/1993 | Keller | ............. 156/500 |
| 5,378,422 A | | 1/1995 | Musiel et al. | ............. 264/238 |
| 5,736,079 A | * | 4/1998 | Kamiguchi et al. | ......... 264/40.1 |
| 5,855,932 A | * | 1/1999 | Bright et al. | ............. 425/444 |
| 5,979,711 A | | 11/1999 | Fuchs et al. | ............. 222/321.2 |
| 5,988,449 A | | 11/1999 | Fuchs et al. | ............ 222/189.11 |
| 6,032,834 A | | 3/2000 | Keung | ............. 222/383.1 |
| 6,189,739 B1 | | 2/2001 | von Schuckmann | ......... 222/182 |
| 6,234,412 B1 | | 5/2001 | von Schuckmann | ......... 239/333 |
| 6,308,867 B1 | | 10/2001 | Wolter | ............. 222/321.6 |
| 6,372,170 B1 | * | 4/2002 | Nishida et al. | ............. 264/255 |
| 6,379,139 B1 | * | 4/2002 | Boucherie | ............. 425/129.1 |
| 6,981,860 B2 | * | 1/2006 | Takemoto et al. | ............ 425/116 |
| 2003/0106906 A1 | | 6/2003 | Rosenthal | ............. 222/321.7 |
| 2003/0107156 A1 | * | 6/2003 | Rollins | ............. 264/328.11 |

FOREIGN PATENT DOCUMENTS

| | | |
|---|---|---|
| DE | 38 17 632 | 11/1989 |
| DE | 41 10 302 | 10/1992 |
| DE | 196 24 986 | 11/1997 |

(Continued)

Primary Examiner—Yogendra N. Gupta
Assistant Examiner—Emmanuel S. Luk
(74) Attorney, Agent, or Firm—Flynn, Thiel, Boutell & Tanis, P.C.

(57) ABSTRACT

An all plastic metering pump having a bellows-type spring with a tubular valve which is integrally formed on it in a single piece in a discharge region toward a metering head, the tubular valve being designed as a discharge valve of the metering pump. In the method, the pump components, which have been manufactured in each case in a plurality of injection cycles, are assembled from the injection mold in a defined assembly sequence in time with the injection cycles, the number of assembly steps corresponding to the number of injection cycles for producing the various pump components.

17 Claims, 8 Drawing Sheets

FOREIGN PATENT DOCUMENTS

| | | |
|---|---|---|
| DE | 197 13 721 | 10/1998 |
| EP | 0 342 651 | 11/1989 |
| EP | 0 370 257 | 5/1990 |
| WO | WO 94/20221 | 9/1994 |
| WO | WO 96/37308 | 11/1996 |

\* cited by examiner

METERING PUMP, METHOD FOR ITS PRODUCTION AND DEVICE FOR CARRYING OUT THE METHOD

FIELD OF THE INVENTION

The invention relates to a metering pump for delivering a medium, having a plurality of pump components, and to a method for producing a plurality of metering pumps and to a device for carrying out a method of this type.

BACKGROUND OF THE INVENTION

A metering pump of this type is known from DE 196 27 228 A1. The known metering pump has a bellows-type spring which is used as a restoring spring for a corresponding pump-actuating element. Moreover, the bellows-type spring is designed as a pump chamber. The bellows-type spring is assigned an intake valve on its side which faces a media store. A discharge valve which is positioned in particular in a metering head is provided on the opposite discharge side of the bellows-type spring. The bellows-type spring is provided with a helically designed bellows-type casing.

It is generally known, moreover, to construct a metering pump largely from pump parts which are produced by injection molding. To produce the pump parts, a plurality of injection molds are provided in which the pump parts are injected. After the finished injection molded parts have been ejected, the latter are fed to assembly devices and are assembled by means of these assembly devices to form the metering pump. If the metering pumps are required in high piece numbers, the assembly is carried out fully automatically. In this case, injection molded parts which are identical in each case are connected in separate containers. The different injection molded parts are then supplied separated from one another in each case to the gripper and assembly devices. The various injection molded parts are put together in various assembly steps to form the finished metering pump.

It is the object of the invention to provide a metering pump, a method for its production and a device for carrying out the method which ensure that the metering pump can be produced cost-effectively and has a simple construction.

SUMMARY OF THE INVENTION

This object is achieved for the metering pump by the fact that all of the pump components are formed as plastic injection molded parts. It is true that it is already known to produce a large number of the pump components of a metering pump by injection molding of plastic. In a comparison with this known prior art, the solution according to the invention further simplifies the producibility of a metering pump by all of the pump components being produced from plastic by injection molding. As a result, an extremely cost-effective production in high piece numbers can be obtained.

In a refinement of the invention, provision is made for the bellows-type spring to be designed as a tubular valve section in a discharge region toward a metering head, said tubular valve section interacting with a corresponding valve seat section of a metering head of the metering pump. The tubular valve section is used as a discharge valve of the pump chamber within the bellows-type spring. The single-piece integration of the discharge valve in the bellows-type spring results in a further reduction in required pump parts. The metering pump manages, in particular, with a housing part designed as a plastic injection molded part, the bellows-type spring and a metering head. The bellows-type spring may also be assigned an intake valve just for the connection to a media store, onto which the metering pump can be placed, it being possible for said intake valve to be designed in a simple manner as a disk valve, preferably as a punched plastic plate part. The metering pump can be used for different media, in particular for liquids, gels or foams. Metering pumps can particularly preferably be used for pharmaceutical or cosmetic products. The metering pump according to the invention can be produced cost-effectively in large piece numbers, since it has just a few pump components. It is advantageous if, in the region of the valve seat section of the metering head, at least one ventilation profiling is provided which, on compression of the tubular valve, permits the pump chamber to be ventilated, i.e. the tubular valve section to be opened, even if the encircling sealing edge of the tubular valve section does not lift off from the valve seat section. The tubular valve section is designed as a sleeve-shaped extension of the bellows-type spring in its discharge region. A conical section which is integrally formed as a single piece on the metering head is preferably provided as the associated valve seat section of the metering head.

In a refinement of the invention, the tubular valve section is provided in the manner of a cup spring with an annular constriction. This ensures that, when the tubular valve is opened, it undergoes a defined, axial compression which is uniform over its entire circumference, as a result of which the medium is delivered particularly uniformly and reliably. In addition, a uniform and simultaneous lifting off of the valve seat, which is assigned to the metering head, and therefore a simultaneous opening of the discharge valve, is achieved.

In a further refinement of the invention, the metering head has a guide connection which engages axially over the outside of the discharge region of the bellows-type spring and fits in an axially moveable manner on the discharge region of the bellows-type spring. As a result, the guide connection of the metering head accommodates the tubular valve section of the bellows-type spring. The axial moveability of the metering head relative to the bellows-type spring can be dimensioned to be small and is used above all to press the nozzle head a small amount axially in the direction of the pump chamber in order to ventilate the bellows-type spring, i.e. in order to briefly open the discharge valve. This makes it possible to carry out a priming, i.e. a ventilation of the pump chamber, before the metering pump is put into operation for the first time.

In a further refinement of the invention, the guide connection of the metering head and the discharge region of the bellows-type spring are guided in a torsionally secured manner with respect to each other. This refinement is particularly advantageous if the bellows-type spring is of helical design in the manner of a screw in its casing region, preferably with differing helical pitches in the inner and outer region. Corresponding torsional forces in an axial compression of the bellows-type spring are therefore also transmitted to the metering head.

In a further refinement of the invention, a finger-type toothing which is aligned axially relative to a pump axis is provided as the torsional securing means. The finger-type toothing is formed by finger-shaped supporting extensions which are distributed uniformly over the circumference of the guide connection of the metering head and protrude axially. Corresponding to this, groove-shaped cutouts which are open axially toward the supporting extensions are provided in the region of an outer circumference of the discharge region of the bellows-type spring. The supporting extensions and the cutouts which form the finger-type toothing can therefore be plugged one into another in a rotationally secure manner. Nevertheless, a certain, relative axial moveability between the elements of the finger-type toothing is retained.

In a further refinement of the invention, the bellows-type spring is held frictionally by an intake region in the pump housing. The intake region is that region of the bellows-type spring which faces the corresponding media store. An intake valve, in particular in the form of a plate valve, is preferably provided in the intake region. For this purpose, the intake region of the bellows-type spring or a corresponding region of the pump housing are preferably provided with a corresponding valve seat on which the plate valve rests. As a means of frictionally securing the bellows-type spring, a clamping of the bellows-type spring in its intake region is provided in particular. The clamping of the bellows-type spring prevents the intake region of the bellows-type spring from rotating at the same time as the bellows-type spring is compressed or correspondingly reset. This refinement is therefore particularly advantageous in a bellows-type casing of helical design, in which torsional loads are also exerted on the pump components.

For the method for producing a plurality of metering pumps from plastic injection molded parts which are assembled to form the metering pumps, the object on which the invention is based is achieved in that, in each case, all of the pump components for at least one metering pump in each case are manufactured in a common injection cycle in each case, in that an assembly sequence is predetermined for the pump components, and in that the pump components which follow one another in the assembly sequence are assembled in time with the injection cycles, the number of assembly steps corresponding to the number of injection cycles for producing a corresponding number of metering pumps. The different pump components, which are produced in each case in an individual, common injection molding die, are inserted from the injection molding die, by opening of the latter, directly into corresponding assembly holders. After the injection molding die is closed again and the next injection cycle finished, these assembly holders are changed in their position to such an extent that, when the injection molding die is subsequently opened and the assembly holders delivered to the corresponding positions of the different pump components in the injection molding die, a positioning takes place in such a manner that the pump component coming next in each case in the assembly sequence is placed onto the preceding pump component which is already in the installation holder. With each injection cycle, a further pump component can therefore be placed in each case in the assembly sequence onto the pump components which are already present. This takes place until the metering pump is finished.

For the device, the object on which the invention is based is achieved in that an assembly platform which has assembly holders for the injection molded parts is provided, the assembly platform being able to be delivered to the injection molding die in such a manner that the injection molded parts can be inserted from the injection molding die into the assembly holders by a plugging-in process, and in that, after the injection molded parts have been inserted, the assembly platform can be moved away again from the injection molding die. This avoids a transporting process of the finished injection molded parts to a corresponding assembly device, by the assembly platform being delivered directly to the injection molding die. The assembly platform is preferably driven into the opened injection molding die. The insertion of the finished injection molded parts from the injection molding die into the corresponding assembly holders of the assembly platform can advantageously take place by making use of a closing movement of at least one die half of the injection molding die, which movement is required in any case to close the injection molding die, for the purpose of inserting, preferably plugging, the finished injection molded parts into the assembly holders. After the assembly platform has been moved away, the next injection cycle in the injection mold for the following injection molded parts can take place in a simple manner. The compressive force of the die half, which force is derived from the closing movement, advantageously also applies the required force for pressing the injection molded parts together for their ready-assembled position within each assembly holder.

In a refinement of the device, the assembly platform can be changed in its delivery position relative to the injection molding die in such a manner that, for each injection cycle, the assembly holders can be delivered in a changed position relative to the positions in the injection molding die for the injection molded parts and hold the injection molded parts respectively following in the assembly sequence at the positions at which injection molding parts of the at least one preceding assembly step are already positioned. This enables a plurality of pump components, i.e. injection molded parts, to be inserted in each assembly holder in consecutive steps in accordance with the assembly sequence, as a result of which the pump components are already positioned with respect to one another in the correct assembly sequence in the respective assembly holder and are finished by simply being pressed together, in particular by means of a closing movement of the one die half.

In a further refinement of the device, means for moving the injection molded parts out of the injection molding die into the assembly holders are provided. For this purpose, ejectors which are assigned to the different cavities for producing the injection molded parts are preferably provided in the injection molding die.

In a further refinement of the invention, means for plugging together the injection molded parts in the assembly sequence in the assembly holders are provided. The ejectors in the cavities of the injection molding die, which also constitute the means for moving the injection molded parts out, are preferably used for this purpose. In addition or as an alternative, it is advantageous to use the movement of the opening and closing die half of the injection molding die as the plugging-together means.

In a further refinement of the invention, means for removing the ready-assembled metering pumps from the assembly platform are provided. Means of this type may be formed by ejectors which are arranged in the assembly platform. It is also possible to provide one or more gripper devices which, from the outside, move away the ready-assembled metering pumps from the assembly holders of the assembly platform.

A particularly preferred refinement of the device makes provision to move the assembly platform into or out of the opened injection molding die linearly, in particular by means of a slide-type guide. If the to and fro movement of the injection molding die takes place in the vertical direction, it is advantageous to move the assembly platform into or out of the injection molding die horizontally, i.e. transversely with respect to it.

In a further refinement of the invention, the assembly platform can be rotated about a central axis of rotation and can be locked in different rotational positions. This is a particularly simple design which can be realized in a functionally reliable manner. A rotational mounting is preferably provided in the region of the center of the assembly platform. The locking in the various rotational positions ensures that the assembly holders are in each case aligned in the positions in which the direct receiving of the injection molded parts from the opened injection molding die is ensured. The assembly platform can preferably be rotated in a horizontal plane which corresponds to the opening plane of the injection molding die.

BRIEF DESCRIPTION OF THE DRAWINGS

Further advantages and features of the invention emerge from the claims and from the following description of preferred exemplary embodiments of the invention which are illustrated with reference to the drawings.

DETAILED DESCRIPTION

Figure 1:
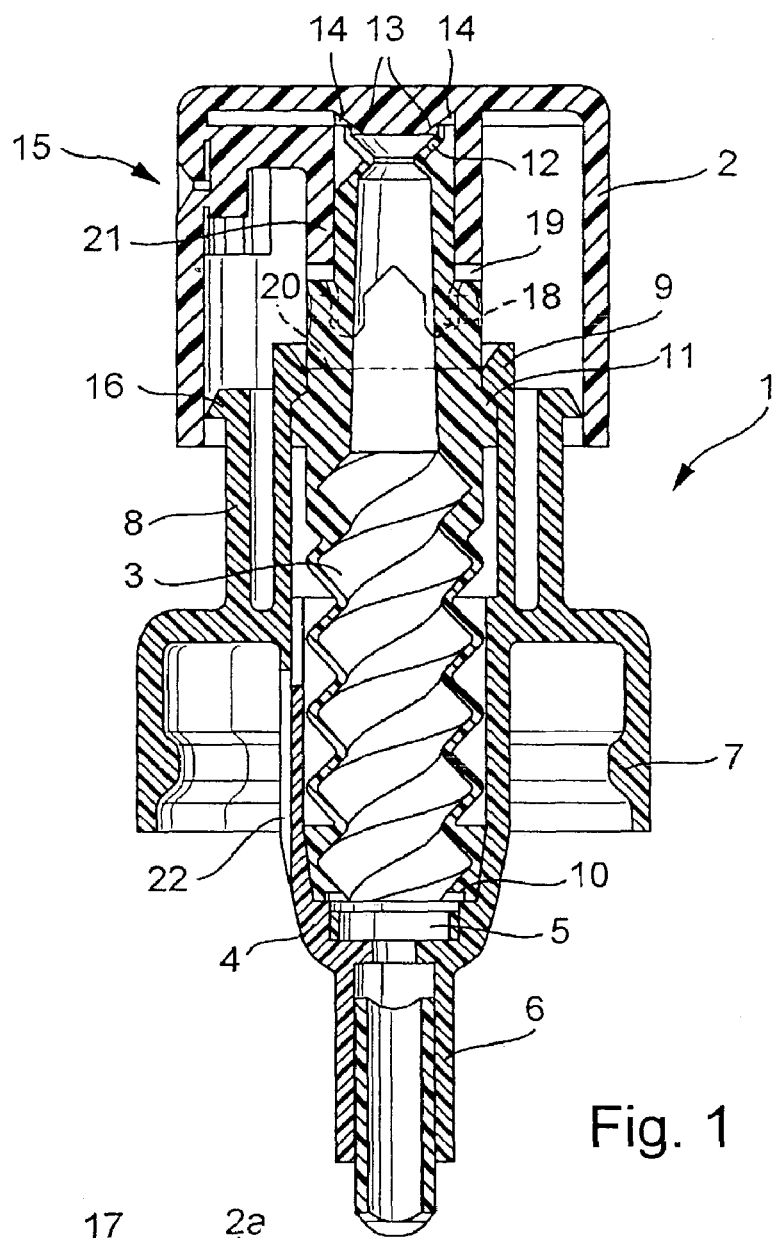
FIG. 1 shows, in a sectional illustration, an embodiment of a metering pump according to the invention with a metering head designed as a spray head.

A metering pump according to FIGS. 1 to 6 is constructed exclusively from pump components in the form of plastic injection molded parts. The metering pump 1 is composed overall of four plastic injection molded parts. A first plastic injection molded part is a housing 4 which is provided with an integrally formed closure cap section 7 for placing the metering pump 1 in a sealed manner onto a media store (not illustrated more specifically) in the form of a container. A pump chamber of the metering pump 1 is formed by a bellows-type spring 3 which is described below in greater detail and is likewise formed as a plastic injection molded part. A plate valve or disk valve 5, which likewise constitutes a plastic injection molded part, is assigned to the bellows-type spring 3 on its lower side, i.e. in an intake region facing toward the media store. A metering head, in the present case in the form of a spray head 2, is placed onto a discharge region of the bellows-type spring 3, which is provided on an end section of the bellows-type spring 3 that lies opposite the intake region, said metering head being guided in a manner such that it is able to travel with respect to the housing 4.

The housing 4 has a funnel-like holder into which the bellows-type spring 3 can be inserted from above. A connection piece 6 is provided in a lower end region of the housing 4, into which a rising pipe (not referred to more specifically) or a rising tube can be inserted. The rising pipe or the rising tube protrudes into the interior of the media store as far as the bottom thereof in order to suck up the corresponding medium, in particular a liquid or a gel. A graduation in the shape of a shoulder is provided in a transition region of the housing 4 between the connection piece 6 and the funnel-like receiving region for the bellows-type spring 3 and forms a valve seat for the plate valve 5. The plate valve 5 is mounted in an axially moveable manner—with reference to a central longitudinal axis of the metering pump 1, its ability to move upward being restricted by a corresponding annular shoulder section 10 of the bellows-type spring 3. The plate valve 5 forms an intake valve for a pump chamber, which is formed by the interior of the bellows-type spring 3. The plate valve 5 opens as soon as a negative pressure relative to the pressure in the media store arises within the bellows-type spring 3. If the pressure within the pump chamber is equal in size or larger than the pressure in the media store, the plate valve 5 tightly seals an inlet opening in the intake region 10 of the pump chamber, i.e. on the lower end region of the bellows-type spring 3 or in the region of the valve seat on the housing.

Above the section forming the closure cap 7, the housing 4 has a cylindrical guide section 9 which is aligned coaxially with respect to the central longitudinal axis and is provided on the inside in its upper edge region with an annular stop shoulder. The stop shoulder is used for restricting the ability of the bellows-type spring 3 to lift upward. For this purpose, the bellows-type spring 3 has a correspondingly outwardly directed annular shoulder 11 which takes on the function of a guide piston within the cylindrical guide section 9 of the housing 4.

Coaxially with respect to the guide section 9, the housing 4 has a second sleeve ring 8 which is situated further outward and is provided in the region of its upper end edge with a latching ring 16 which faces outward. An outer casing of the metering head 2, which is of cup-like design, is latched onto this latching ring 16. For this purpose, the casing of the cup-shaped metering head 2 has a respective latching lug 17 (FIGS. 2 and 3) on two opposite sides of its lower edge region. The latching lugs of the metering head 2 correspond in shape and arrangement to the latching lugs 17 of the metering head 2a according to FIGS. 2 and 3.

Figure 6:
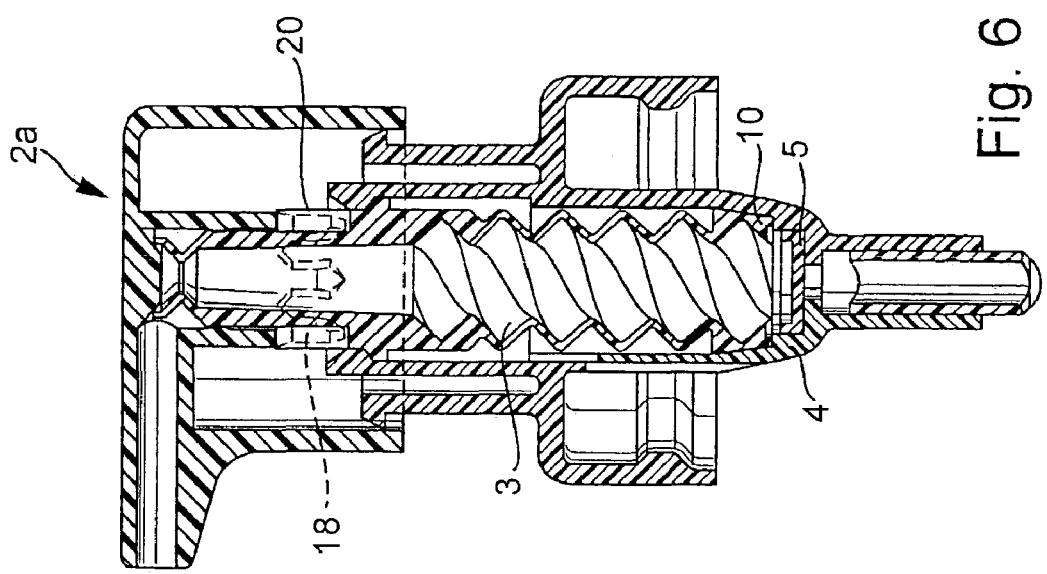
FIG. 6 shows, likewise in a schematic sectional illustration, the pump components according to FIG. 5 for the metering pump according to FIGS. 1 to 3, the metering head according to FIGS. 2 and 3 additionally being placed onto the bellows-type spring and onto the housing.

The bellows-type spring 3 is provided in its lower section with the intake region 10 which is frictionally supported by its conical outer circumference on a correspondingly conical inner wall section of the housing 4. The bellows-type spring 3 is produced from elastically compliant material and is shown in FIG. 6 schematically in its unloaded position. The bellows-type spring 3 is inserted under prestress into the housing 4 and is clamped in its lower intake region 10 in the housing 4. Adjoining the lower intake region 10, the bellows-type spring 3 has a bellows-type casing which is of helical design and is provided with different helical pitches. The basic design of a bellows-type casing of this type is already known from DE 196 27 228 A1 and so reference should be made to the associated disclosure in DE 196 27 228 A1 for a more detailed explanation. The bellows-type spring 3 firstly has, integrally formed in a single piece upward on the bellows-type casing, the guide piston section 5 which is provided with the annular shoulder 11 and ensures this is able to travel within the cylindrical guide section 9 of the housing 4. Adjoining further upward is a cylindrical discharge region which is provided in the upper end region with a tubular valve section 12 integrally formed on it as a single piece. The guide piston region and the discharge region until shortly below the tubular valve section 12 are of thicker design than the bellows-type casing and are therefore at least largely dimensionally stable in the radial direction and in the axial direction. In a transition region between the guide piston region and the discharge region, the bellows-type spring 3 is provided with an annular step which constitutes a graduation from the guide piston region with a relatively large diameter to the discharge region with a relatively small diameter. The bellows-type spring 3 is produced from an elastic plastic material.

Figure 5:
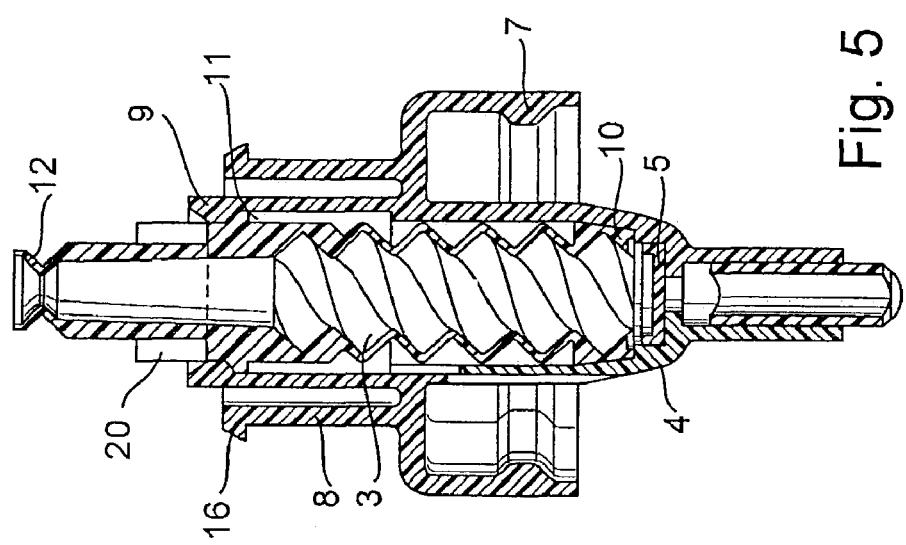
FIG. 5 shows, likewise in a schematic sectional illustration, the two pump components according to FIG. 4 into which a bellows-type spring is inserted as a further pump component.
Figure 4:
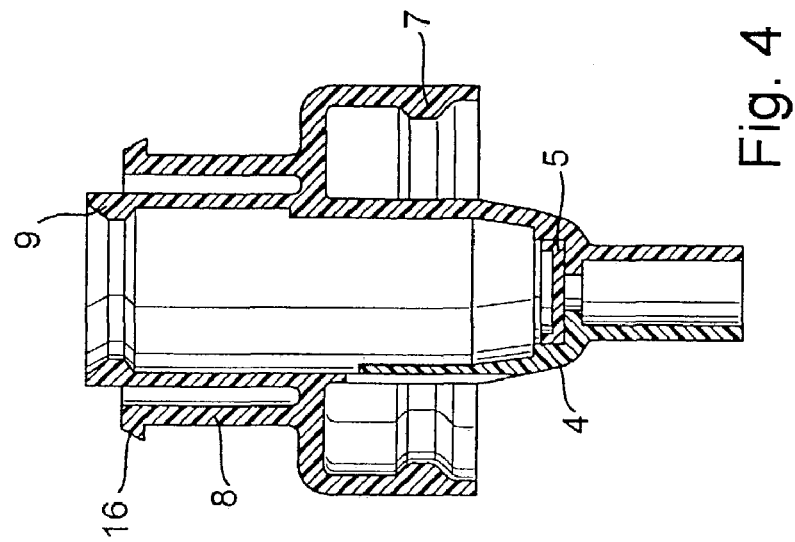
FIG. 4 shows, schematically in a sectional illustration, a housing and a disk-shaped intake valve for the metering pump according to FIGS. 1 to 3.

As can be seen with reference to FIG. 5, a plurality of grooves 20 which are upwardly open are distributed over the circumference of this cylindrical section in this thicker region. Said grooves are used for accommodating finger-shaped extensions 18 of a guide connection 21 of the metering head 2a, it being possible for the guide section 21 to be placed onto the cylindrical discharge region of the bellows-type spring 3. Together with the finger-shaped extensions 18, the grooves 20 form a finger-type toothing and therefore connected securely with respect to rotation between the metering head 2 and bellows-type spring 3. The guide connection 21 and therefore also the metering head 2 are held in an axially displaceable manner within certain limits on the discharge region of the bellows-type spring 3. For this purpose, an axial clearance 19 is provided between the guide connection 21 and the graduated step of the bellows-type spring 3. The lower ends of the finger-shaped extensions 18 also end at a distance above the base of the grooves 20.

The sectional illustration according to FIG. 1 constitutes an enlargement on the scale of 4:1. The axial clearance 19 is therefore only approximately 0.5 mm. The metering head 2 can therefore be depressed downward by approximately 0.5 mm relative to the bellows-type spring 3 without the bellows-type spring 3 itself being depressed downward and therefore being compressed.

Figure 2:
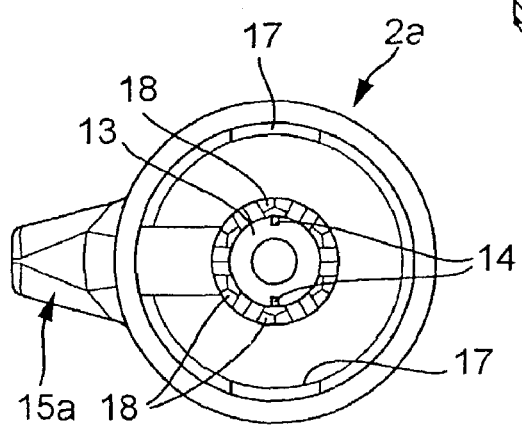
FIG. 2 shows, in a view from below, a metering head for the metering pump according to FIG. 1 that is designed for delivering gel or foam.
Figure 3:
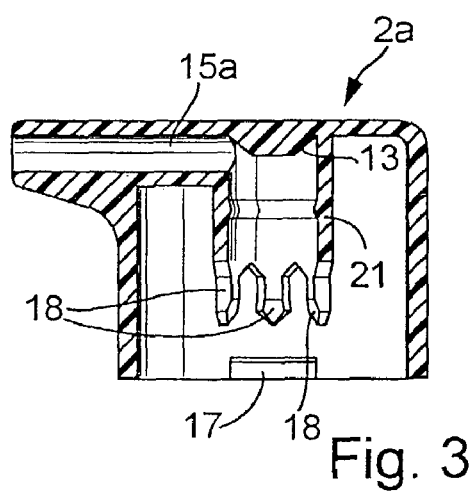
FIG. 3 shows a cross section through the metering head according to FIG. 2.

The tubular valve section 12 of the bellows-type spring 3 is provided with an annular constriction, so that the sectional profile which is illustrated in FIG. 1 is produced for the tubular valve section 12. The tubular valve section 12 has an encircling, upper end edge which bears in an encircling and tight manner against a conical valve seat section 13 on an inner side of a cover section of the metering head 2. At its radially outer, and therefore, according to FIG. 1, upper end, the conical valve section 13 is provided with a plurality of ventilation ribs 14, according to FIG. 2 is provided with two opposite ventilation ribs 14. These ventilation ribs 14 are used for ventilating the interior of the bellows-type spring, i.e. the pump chamber, for "priming" purposes. For this purpose, the metering head 2 is pressed downward by approximately 0.5 mm as previously discussed. As a result, the upper annular edge of the tubular valve section 12 slides upward along the oblique surfaces of the conical valve seat section 13 until it rests against the ventilation ribs 14 and is therefore deformed. This deformation in the region of the ventilation ribs means that the upper end edge of the tubular valve section 12 no longer bears in an encircling and tight manner against the conical valve seat section 13, so that an adequate amount of air can escape. In addition, the metering head has, in a manner which is basically known, a spray nozzle 15 which permits the delivery of the corresponding medium from the interior of the bellows-type spring 3 to the outside.

Below the closure cap section 7, the housing 4 has a ventilation slot 22 which effects an equalization of the pressure for the container interior of the media store. The ventilation slot 22 provides an opening between the media store and the interior space of the housing 4 that surrounds the bellows-type spring 3, so that venting of the container interior of the media store is made possible via the cylindrical guide section, as a result of which pressure in the media store is equalized during corresponding processes of delivering a medium.

Figure 7:
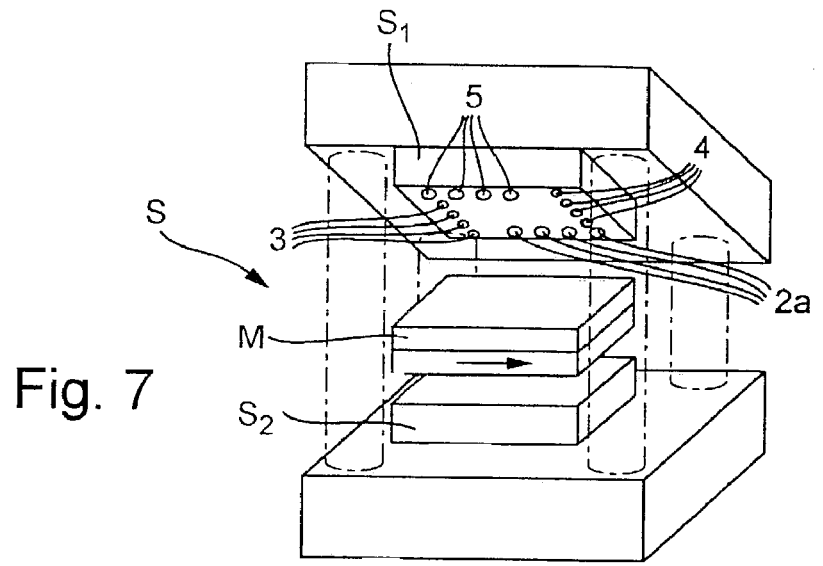
FIG. 7 shows, in a schematic, perspective illustration, an injection molding die for producing the pump components according to FIGS. 4 to 6, in a first position.
Figure 8:
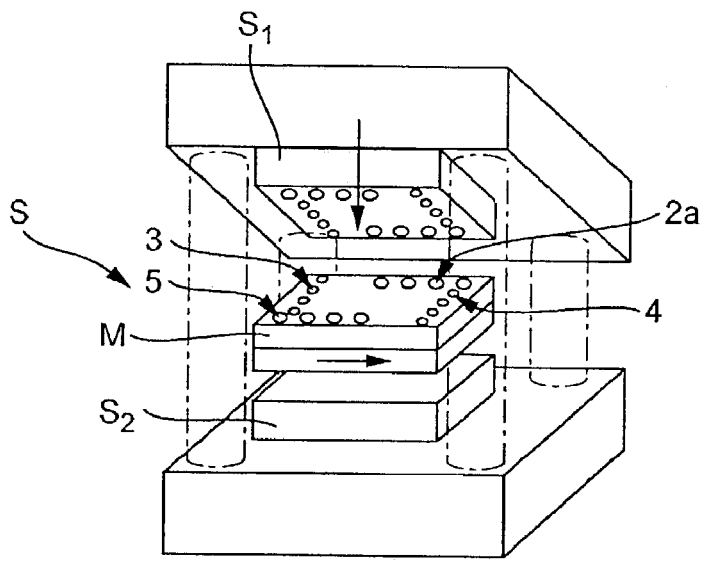
FIG. 8 shows the injection molding die according to FIG. 7 in an opened, second position.
Figure 9:
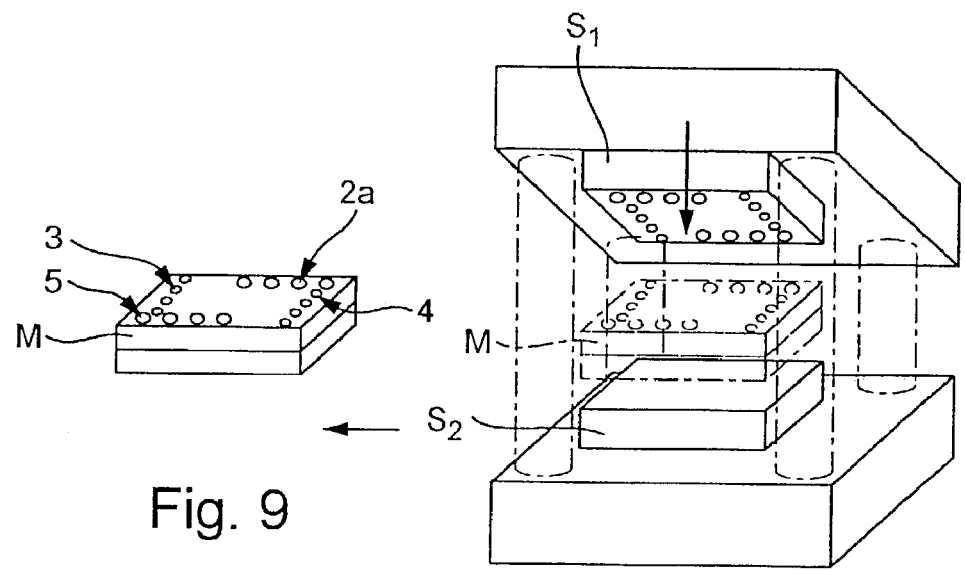
FIG. 9 shows the injection molding die according to FIGS. 7 and 8 in a further functional state with the assembly platform moved away.

The pump components of the metering pump 1 according to FIGS. 1 to 6 are produced in a common injection molding die S (FIGS. 7 to 9). Two different extruders for the different plastic materials are assigned to the injection molding die S, the one extruder PE (FIGS. 10 to 18) supplying polyethylene material and the other extruder PP supplying polypropylene material. The injection molding die S has two mold halves $S_1$, $S_2$ which can be moved to and fro vertically by means of corresponding pillar guides. The upper mold half $S_1$ is mounted with respect to the fixed, lower mold half $S_2$ in a manner such that it is able to travel by means of the pillar guides and suitable drives. Different cavities for each pump component are provided in the injection molding die S. The injection molding die S is configured as a two-component machine in which the two different plastic materials are simultaneously injected into the corresponding cavities for the housing 4, the bellows-type spring 3, the metering head 2a and the plate valve 5 via the two extruders PE, PP. In the embodiment illustrated, each pump component can be produced four times by one injection molding process.

After the injection of in each case four examples of all four pump components in a common, simultaneous injection molding process, the die is opened and an assembly platform M is moved into the opened die via a slide-type guide L (FIGS. 10 to 18). The assembly platform M has assembly holders which are aligned corresponding to the cavities of the die in such a manner that, when the assembly platform M has been moved in, all of the assembly holders are arranged exactly vertically below the associated cavities of the die, i.e. in particular of the upper mold half $S_1$. To insert the ready-injected pump components 2a, 3 to 5 into the assembly holders of the assembly platform M, the closing movement of the mold half $S_1$ is used in a simple manner. In order to ensure reliable insertion of the finished injection molded parts, i.e. of the pump components, into the assembly holders, the cavities of the upper mold half $S_1$ are assigned corresponding ejectors which press the injection molded parts into the assembly holders of the assembly platform M.

Figure 10:
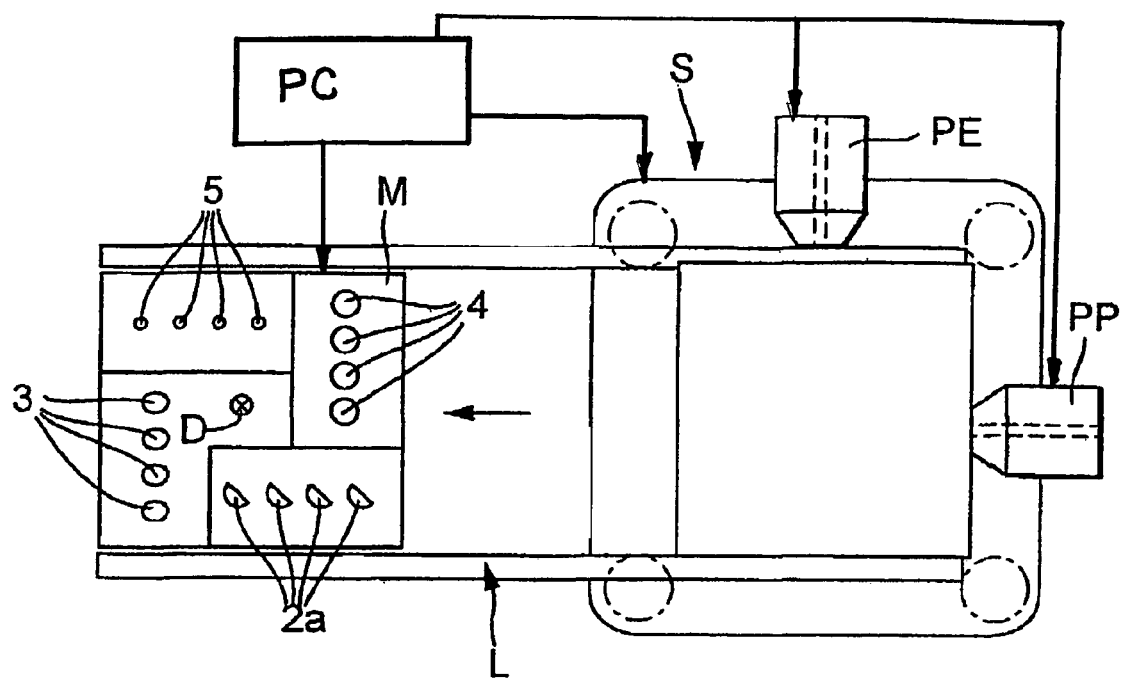
FIG. 10 shows, schematically in a plan view, the functional state in the region of the injection molding die with the assembly platform according to FIG. 9 extended.
Figure 11:
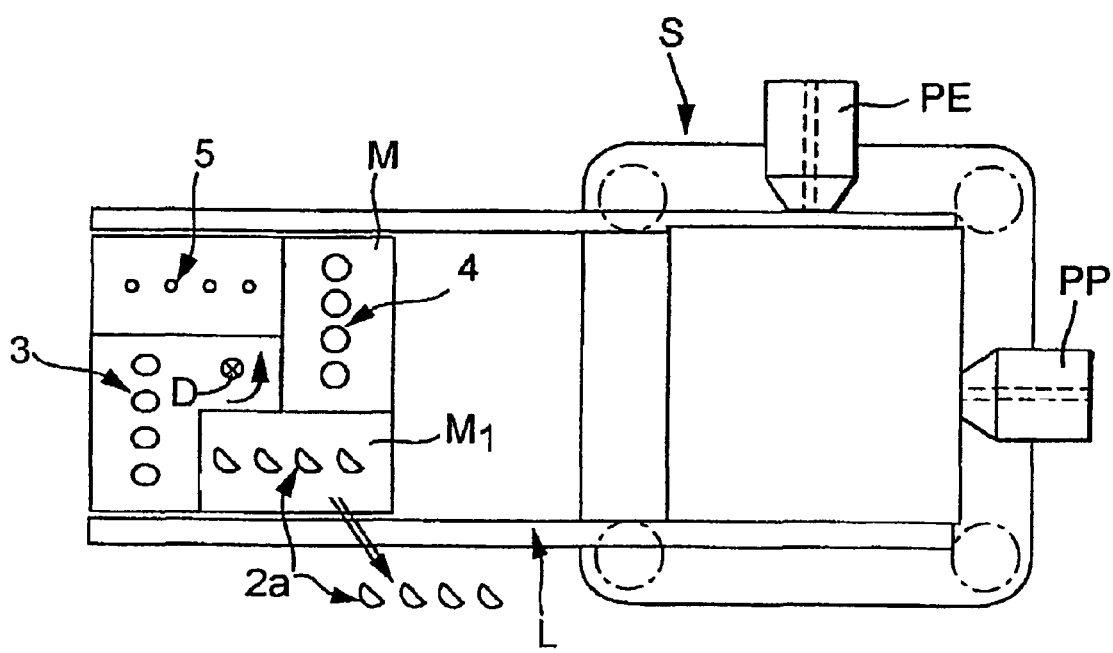
FIGS. 11 to 18 show further functional states of the device according to FIG. 10 for producing and assembling metering pumps according to FIGS. 4 to 6.
Figure 12:
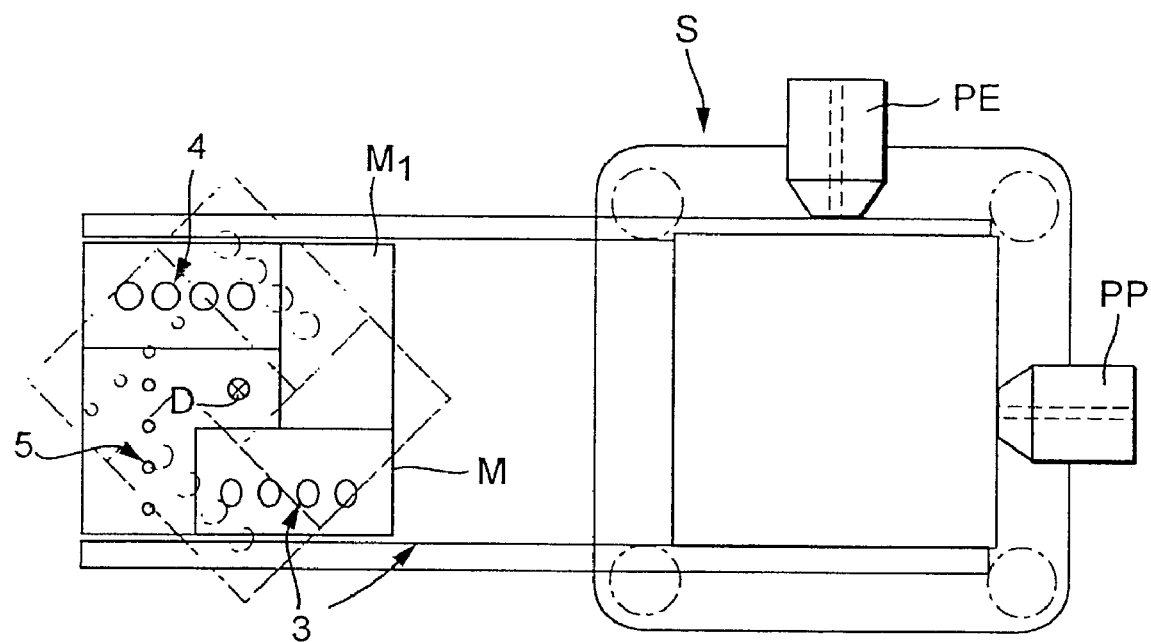
Figure 13:
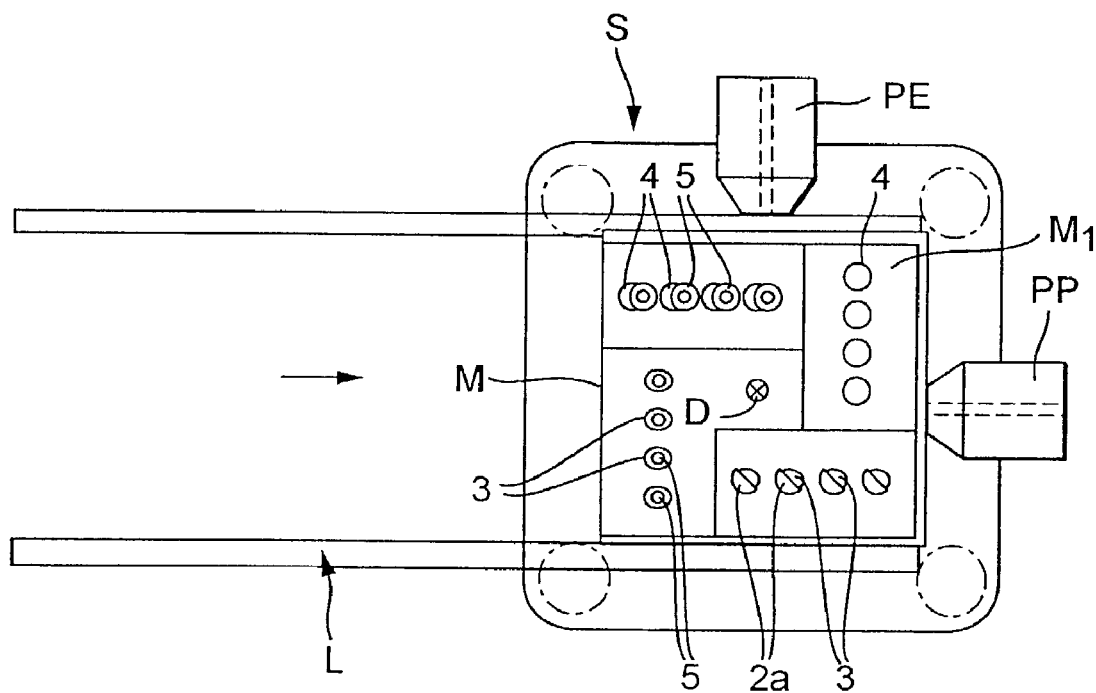
Figure 14:
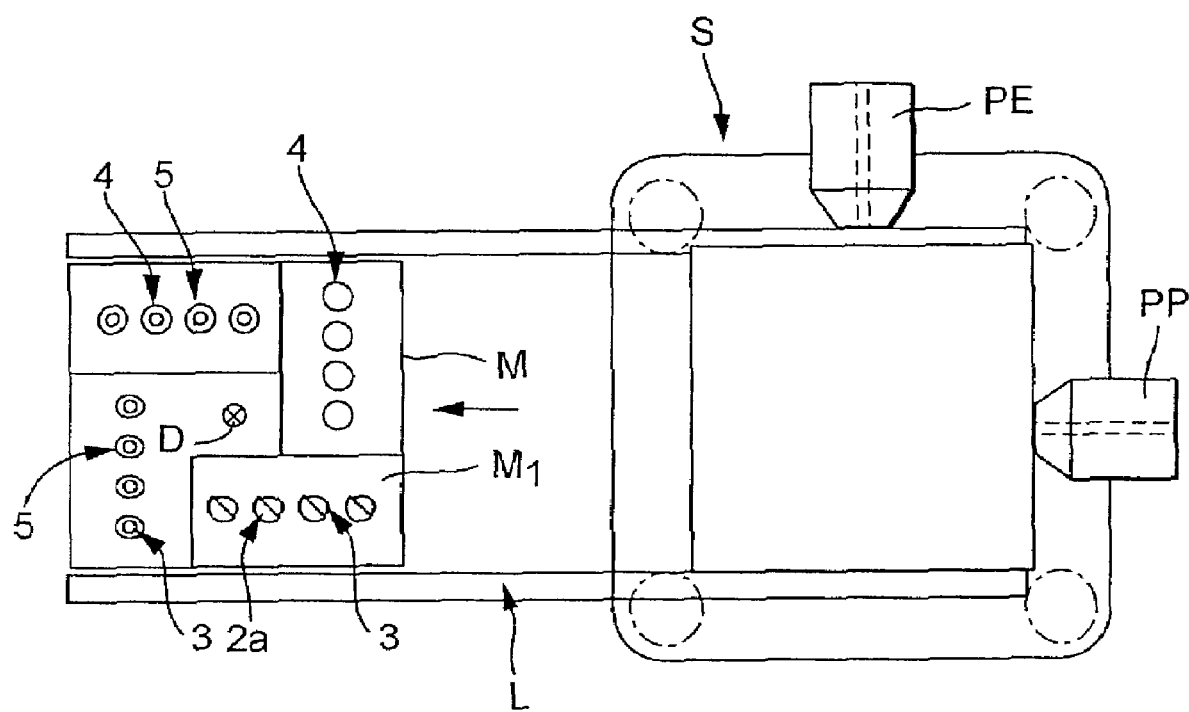
Figure 15:
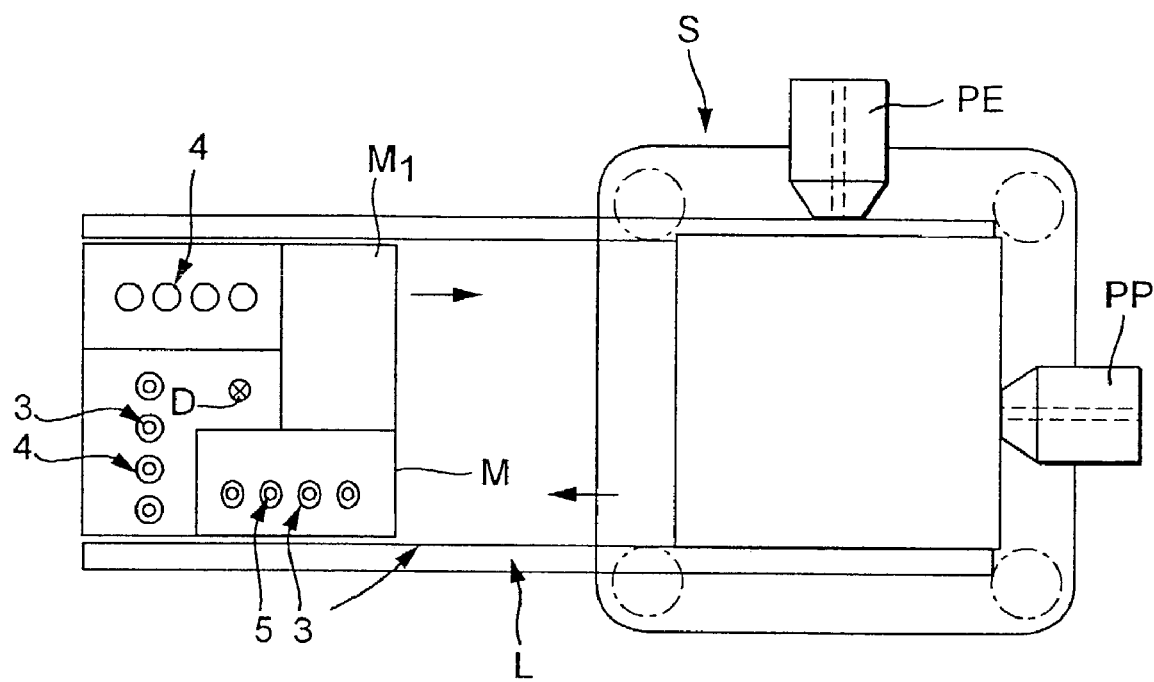
Figure 16:
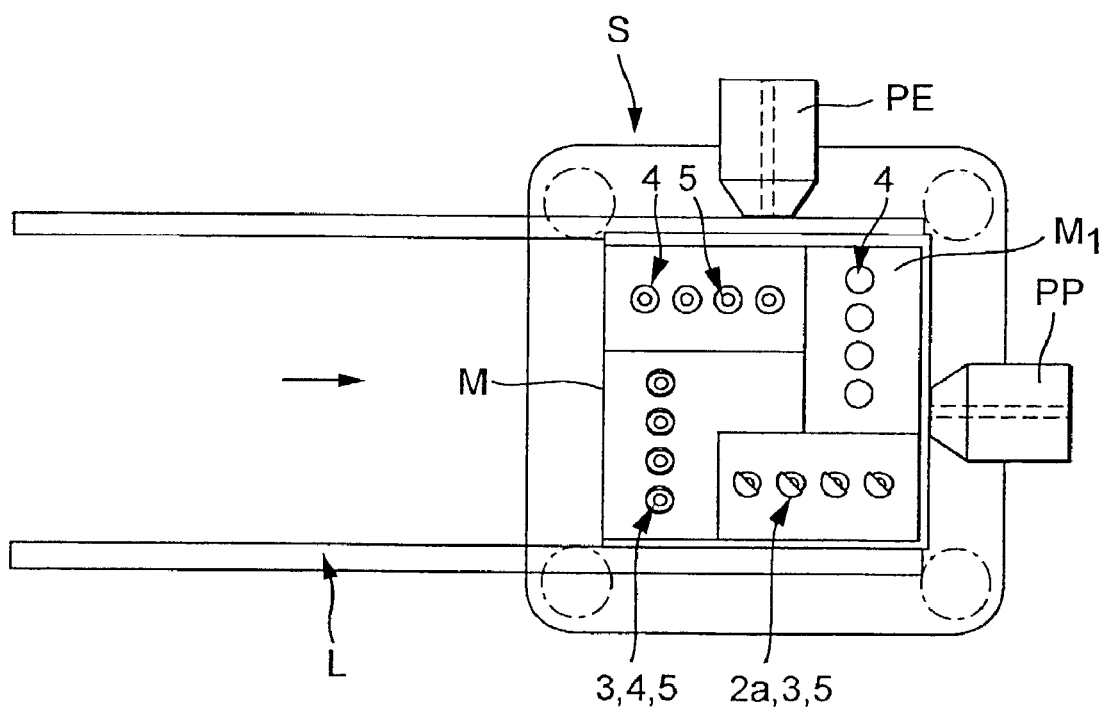
Figure 17:
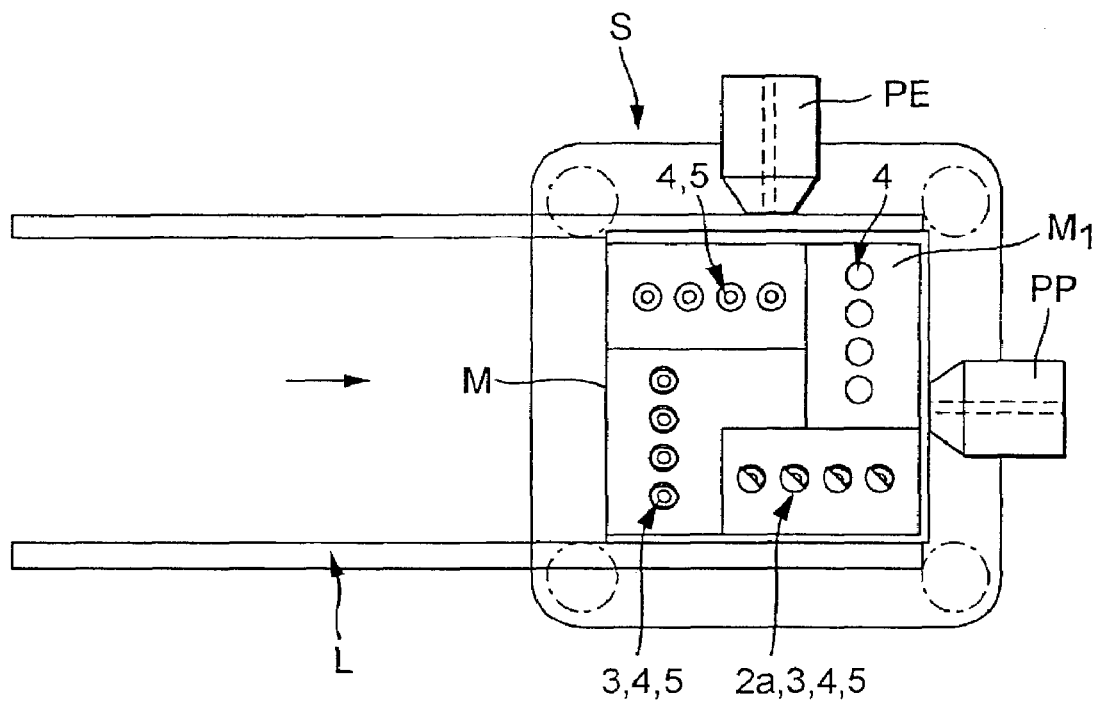
Figure 18:
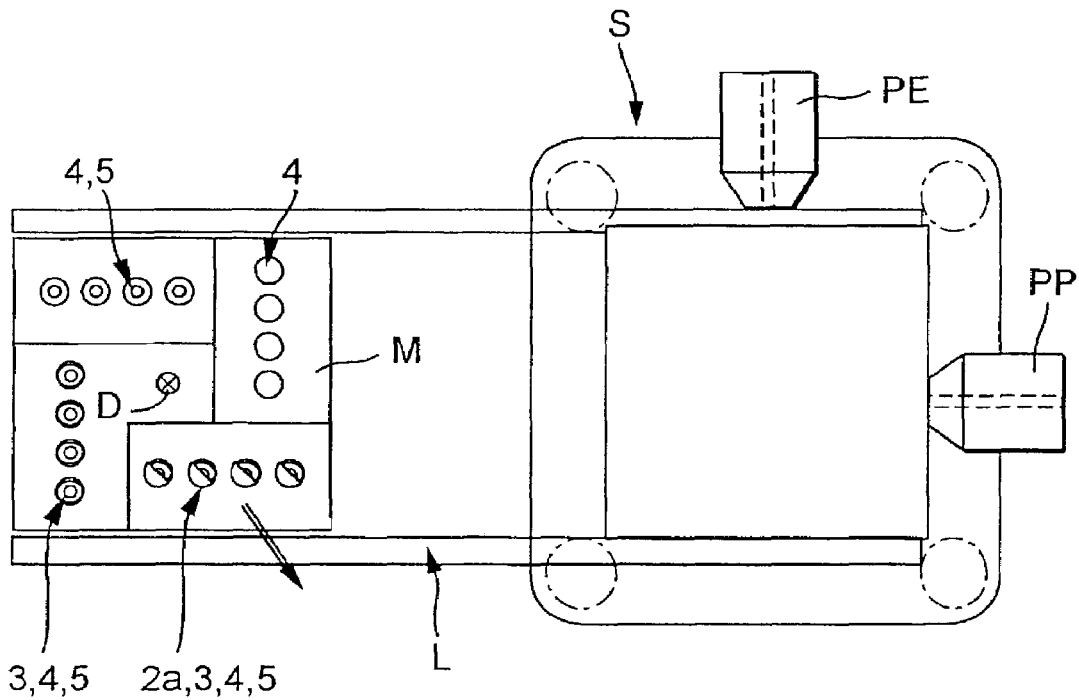

After the pump components which have been produced in a first injection cycle have been inserted, the assembly platform M according to FIGS. 9 and 10 is moved out of the die horizontally by means of the slide-type guide L, which is designed as a transverse slide. According to FIG. 11, in this position that section of the assembly platform M in which the assembly holders for the metering heads 2a are provided is emptied. The metering heads 2a are therefore removed from this section $M_1$ of the assembly platform M. The entire assembly platform M is then rotated horizontally counterclockwise through a pivot angle of 90° about its central vertical axis D. This is illustrated in FIG. 12. The emptied section $M_1$ is now in a position in which it can receive, within the injection molding die, the first pump components in the assembly sequence of the metering pumps, namely the housings 4. The movements and operation of the manufacturing machinery of the mold die S, assembly platform M, extruders PE, PP and ejectors are automatically controlled by a controller PC (FIG. 10), to effect the method of manufacture disclosed herein.

In the meantime, the injection molding die; has been closed again and a second set of pump components, i.e. metering heads 2a, bellows-type springs 3, housings 4 and plate valves 5, produced in a second injection cycle. The injection molding die is then opened again and the assembly platform M moved in accordance with FIG. 13 into the opened die until the assembly platform M is positioned again exactly below the upper mold half $S_1$. The injection molded parts finished in the second injection cycle are subsequently pushed out by the corresponding ejectors and pressed into the corresponding assembly holders of the assembly platform M. It should be noted here that only the section $M_1$ of the assembly platform M is empty. The correspondingly empty assembly holders are fitted with the housings 4. Those sections of the assembly platform M which adjoin the section $M_1$ in the counterclockwise direction have already been provided with injection molded parts prior to the insertion of the injection molded parts of the second injection cycle. A set of housings 4 has thus already been provided in the section adjoining the section $M_1$ in the counterclockwise direction. Plate valves 5 have already been positioned in the section adjoining said section $M_1$ and bellows-type springs 3 have been positioned in the last section. Since the alignment of the mold half $S_1$ of the injection molding die always remains the same, the plate valves 5 are inserted into the housings 4 which are present when the injection molded parts are pushed out of the cavities in accordance with FIG. 13. Bellows-type springs 3 are added to the plate valves 5 and metering heads 2a are added to the bellows-type springs 3 which are present. The assembly platform M is then moved again out of the injection molding die and the injection mold is closed. In a third injection cycle, the same number of pump components as has already been described previously is produced again. The assembly holders which are situated at the bottom according to FIG. 14 and in which there are bellows-type springs 3 and metering heads 2a are taken out of the corresponding assembly holders, resulting again in an empty assembly section $M_1$. After renewed rotation of the assembly platform M through 90° in the direction of the arrow according to FIG. 15 about the axis of rotation D, the assembly platform M is moved into the injection mold which has been opened again in the meantime. The pump components produced in the third injection cycle are then fitted into the corresponding assembly holders of the assembly platform M, if appropriate in addition to the injection molded parts which are already present. The empty assembly holders are again fitted with the housings 4.

The housings 4 constitute the pump components for the first assembly step for putting together and assembling the metering pump 1. The plate valves 5 are inserted in a second assembly step. In a third assembly step, the bellows-type springs 3 are inserted and finally, in a fourth assembly step, the metering heads 2a are put on. Three of the four units of assembly holders are therefore already fitted in the correct sequence in the assembly platform M. Only the unit of the assembly holders which is last in the counterclockwise direction—with reference to the section $M_1$—and which is provided with metering heads 2a, bellows-type springs 3 and plate valves 5, is still provided with pump components which are not fitted together in the correct sequence. After the assembly platform M is extended again in the direction of the arrow (FIG. 16), said assembly holders are removed and the assembly platform M is subsequently rotated again through 90° in the counterclockwise direction. At the same time, a corresponding number of different pump components is again produced in a fourth injection cycle. After the injection mold is opened again, the assembly platform M is moved in and the corresponding injection molded parts are inserted into the assembly holders of the assembly platform M. The corresponding ejectors of the upper mold half $S_1$ and/or a correspondingly simultaneous, vertical closing movement of the upper mold half $S_1$ are used to fixedly put together the corresponding pump components. As a result, in the section which is on the left and at the rear in the extension direction of the assembly platform M, with the placing-on of the metering heads 2a, which are produced in the fourth injection cycle, the first ready-assembled metering pumps are obtained and are removed from the corresponding assembly holders of the assembly platform M after the assembly platform M has been extended (double arrow in FIG. 18). During a subsequent, renewed rotation of the assembly platform M, all four sections of the assembly platform M are therefore positioned and fitted in such a manner that, after each injection cycle, ready-assembled metering pumps can be removed in each case in that section of the assembly platform M which is on the left and at the rear in the extension direction. Individual pump components which do not fit together in the assembly sequence have therefore merely to be removed from this left section of the assembly platform M during the first injection cycles and joined together by hand or by means of a separate assembly device. Subsequently, with each injection cycle and with every inward and outward movement of the assembly platform M, a set of ready-assembled metering pumps can be obtained in each case. Since the corresponding closing movement of the die and/or corresponding ejection movements in the region of the cavities of the die bring about assembly processes, separate assembly devices for the individual pump components are unnecessary. This results in an extremely rapid and cost-effective production of ready-assembled metering pumps which permit the entire device to be used economically for high piece numbers.

What is claimed is:

1. A device for producing a metering pump from plastic injection molded parts, comprising:

an injection molding die for producing the injection molded parts, the injection molding die having a first mold half and a second mold half movable, with respect to the first mold half, between an open position and a closed position;

an assembly platform which has an assembly holder for holding the injection molded parts and which is reconfigurable as to orientation of the assembly holder;

a transverse slide connected to the assembly platform to move the assembly platform in between the mold halves of the injection molding die when the second mold half is in the open position;

a first mold ejector disposed adjacent a first cavity of the second mold half to eject a first one of the injection molded parts from the first cavity;

a second mold ejector disposed adjacent a second cavity of the second mold half to eject a second one of the injection molded parts from the second cavity; and a controller connected to control operation of the injection molding die, the assembly platform, and the first and second mold ejectors, and control the assembly platform in a first configured orientation to move via the transverse slide between the mold halves when the second mold half is in the open position such that the assembly holder is vertically below the first cavity of the second mold half, control the first mold ejector to eject a first one of the injection molded parts from the first cavity and insert the first one of the injection molded parts into the assembly holder, control, after the insertion of the first one of the injection molded parts into the assembly holder, the assembly platform to move via the transverse slide away from the injection molding die, control the second mold half to move into the closed position for the injection mold die to produce additional injection molded parts, control the second mold half to move back into the open position, control the assembly platform to reconfigure into a second configured orientation, control the assembly platform in the second configured orientation to move via the transverse slide between the mold halves such that the assembly holder is vertically below a second cavity of the second mold half, and control the second mold ejector to eject the second one of the injection molded parts from the second cavity and insert the second one of the injection molded parts into the assembly holder and plug the second one of the injection molded parts into the first one of the injection molded parts.

2. The device as claimed in claim 1, further comprising: means for plugging the injection molded parts together in the assembly sequence in the assembly holders.

3. The device as claimed in claim 2, wherein the means for plugging the injection molded parts together comprises a closing movement of the second mold half.

4. The device as claimed in claim 1, further comprising: means for removing the ready-assembled metering pumps from the assembly platform.

5. The device as claimed in claim 4, wherein the means for removing the ready-assembled metering pumps from the assembly platform comprises an assembly platform ejector.

6. The device as claimed in claim 1, the device further comprising: a third mold ejector disposed adjacent a third cavity of the second mold half to eject a third one of the injection molded parts from the third cavity;
wherein the controller is configured to control, after the insertion of the second one of the injection molded parts into the assembly holder, the assembly platform to move via the transverse slide away from the injection molding die, control the second mold half to move into the closed position for the injection mold die to produce additional injection molded parts, control the second mold half to move back into the open position, control the assembly platform to reconfigure into a third configured orientation, control the assembly platform in the third configured orientation to move via the transverse slide between the mold halves such that the assembly holder is vertically below a third cavity of the second mold half, and control the third mold ejector to eject the third one of the injection molded parts from the third cavity and insert the third one of the injection molded parts into the assembly holder and plug the third one of the injection molded parts into the combination of the first and second ones of the injection molded parts.

7. The device as claimed in claim 6, the device further comprising: a fourth mold ejector disposed adjacent a fourth cavity of the second mold half to eject a fourth one of the injection molded parts from the fourth cavity;
wherein the controller is configured to control, after the insertion of the third one of the injection molded parts into the assembly holder, the assembly platform to move via the transverse slide away from the injection molding die, control the second mold half to move into the closed position for the injection mold die to produce additional injection molded parts, control the second mold half to move back into the open position, control the assembly platform to reconfigure into a fourth configured orientation, control the assembly platform in the fourth configured orientation to move via the transverse slide between the mold halves such that the assembly holder is vertically below a fourth cavity of the second mold half, and control the fourth mold ejector to eject the fourth one of the injection molded parts from the fourth cavity and insert the fourth one of the injection molded parts into the assembly holder so as to plug the fourth one of the injection molded parts into the combination of the first, second, and third ones of the injection molded parts to thereby complete assembly of a metering pump.

8. The device as claimed in claim 1, wherein the assembly platform being reconfigurable is provided by the assembly platform being rotatable about a central axis of rotation.

9. A device for producing a metering pump from plastic injection molded parts, comprising:
an injection molding die for producing the injection molded parts; and
an assembly platform separate from said molding die and having assembly holders for holding the injection molded parts following the production thereof, the assembly platform being alternately deliverable to and away from the injection molding die, wherein the assembly platform is changeable in its delivery position relative to the injection molding die in such a manner that, for each of successive injection cycles, the assembly holders are delivered in a changed position relative to positions in the injection molding die for the injection molded parts and hold the injection molded parts respectively following in an assembly sequence at positions at which injection molded parts of at least one preceding assembly step are already positioned for insertion and plugging-in of the injection molded parts into the assembly holders.

10. The device as claimed in claim 9, wherein the assembly platform is rotatable about a central axis of rotation and is lockable in different rotational positions.

11. The device as claimed in claim 9, further comprising: means for moving the injection molded parts out of the injection molding die into the assembly holders.

12. The device as claimed in claim 11, wherein the means for moving the injection molded parts out of the injection molding die comprises a mold ejector.

13. The device as claimed in claim 11, further comprising: means for plugging the injection molded parts together in the assembly sequence in the assembly holders.

14. The device as claimed in claim 13, wherein the means for plugging the injection molded parts together comprises a closing movement of the upper mold half.

15. The device as claimed in claim 9, further comprising: means for removing the ready-assembled metering pumps from the assembly platform.

16. The device as claimed in claim 15, wherein the means for removing the ready-assembled metering pumps from the assembly platform comprises an assembly platform ejector.

17. The device as claimed in claim 9, wherein the assembly platform is moved into and out of the injection molding die via a slide-type guide.

* * * * *